United States Patent [19]

Tremaine et al.

[11] Patent Number: 4,966,405
[45] Date of Patent: Oct. 30, 1990

[54] VEHICULAR WINDSHIELD COVER

[76] Inventors: Shawn A. Tremaine, 7305 Budge Way, Bakersfield, Calif. 93909; Loren M. De La Rosa, 1905 Marc A. Mitscher, Bakersfield, Calif. 93304

[21] Appl. No.: 362,007

[22] Filed: Jun. 5, 1989

[51] Int. Cl.$^5$ ............................................. B60J 11/00
[52] U.S. Cl. .................................. 296/95.1; 160/370.2
[58] Field of Search .............................. 296/95.1, 136; 160/370.2, 368

[56] References Cited

U.S. PATENT DOCUMENTS

| | | | |
|---|---|---|---|
| 3,263,736 | 8/1966 | Macomson | 160/368 |
| 3,874,437 | 4/1975 | Black | |
| 4,049,036 | 9/1977 | Gebhardt | |
| 4,597,608 | 7/1986 | Duffy | |
| 4,635,993 | 1/1987 | Hooper et al. | |
| 4,726,406 | 2/1988 | Weatherspoon | |
| 4,842,324 | 6/1989 | Carden | 296/95.1 |

FOREIGN PATENT DOCUMENTS

| | | | |
|---|---|---|---|
| 43919 | 6/1968 | Fed. Rep. of Germany | 296/95.1 |
| 1580155 | 9/1969 | France | 296/95.1 |

Primary Examiner—Robert R. Song
Attorney, Agent, or Firm—Leon Gilden

[57] ABSTRACT

A vehicular windshield cover is set forth wherein an elongate flexible sheet is provided for overlying securement to a forward windshield of an automobile and the like. The cover includes an elongate cord formed of either flexible stainless steel or of an elastomeric material with enlarged spherical ends secured at each terminal end of the cord for maintaining the cord within the automobile when clamped between the associated automobile's door frame and door. A series of pairs of aligned legs are secured at opposed sides of the cover with pockets formed therein for securement of magnets, wherein the magnets assist in securement of the cover to the automobile. Alternatively, suction cups may be utilized in lieu of magnets or the magnets may be formed as spherical shot contained within elongate aligned pouches directed outwardly of each side of the cover. A further modification presents the cover formed of a stretchable fabric with magnet pockets extending exteriorly of each side of the cover with tubular pockets including confined magnetic shot formed coextensively and contiguously with each end of the cover.

6 Claims, 4 Drawing Sheets

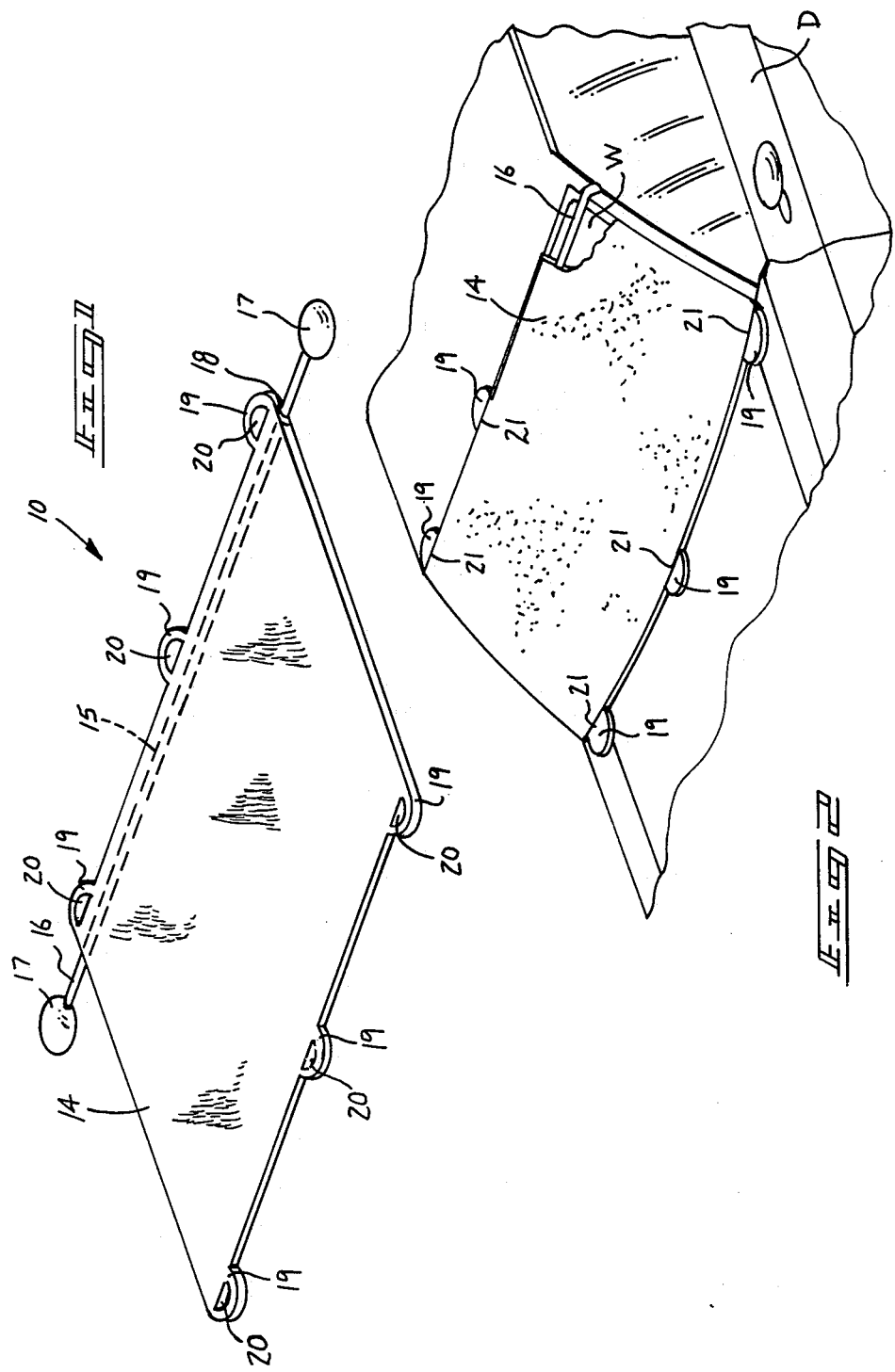

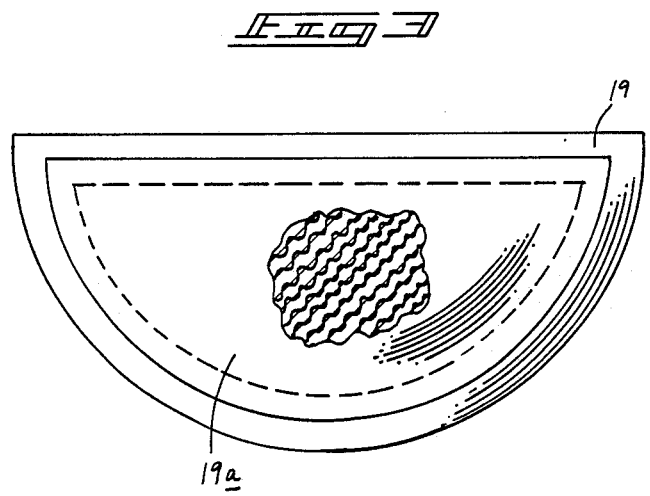
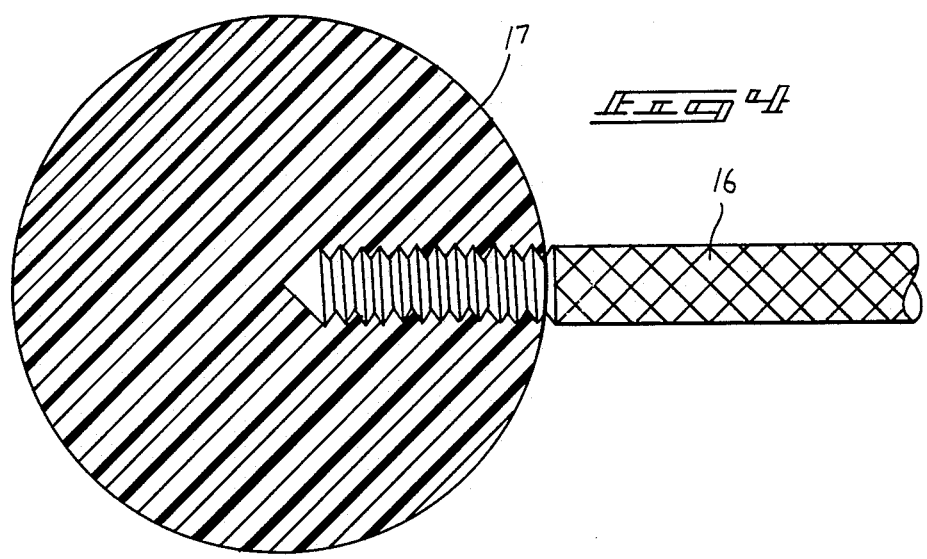

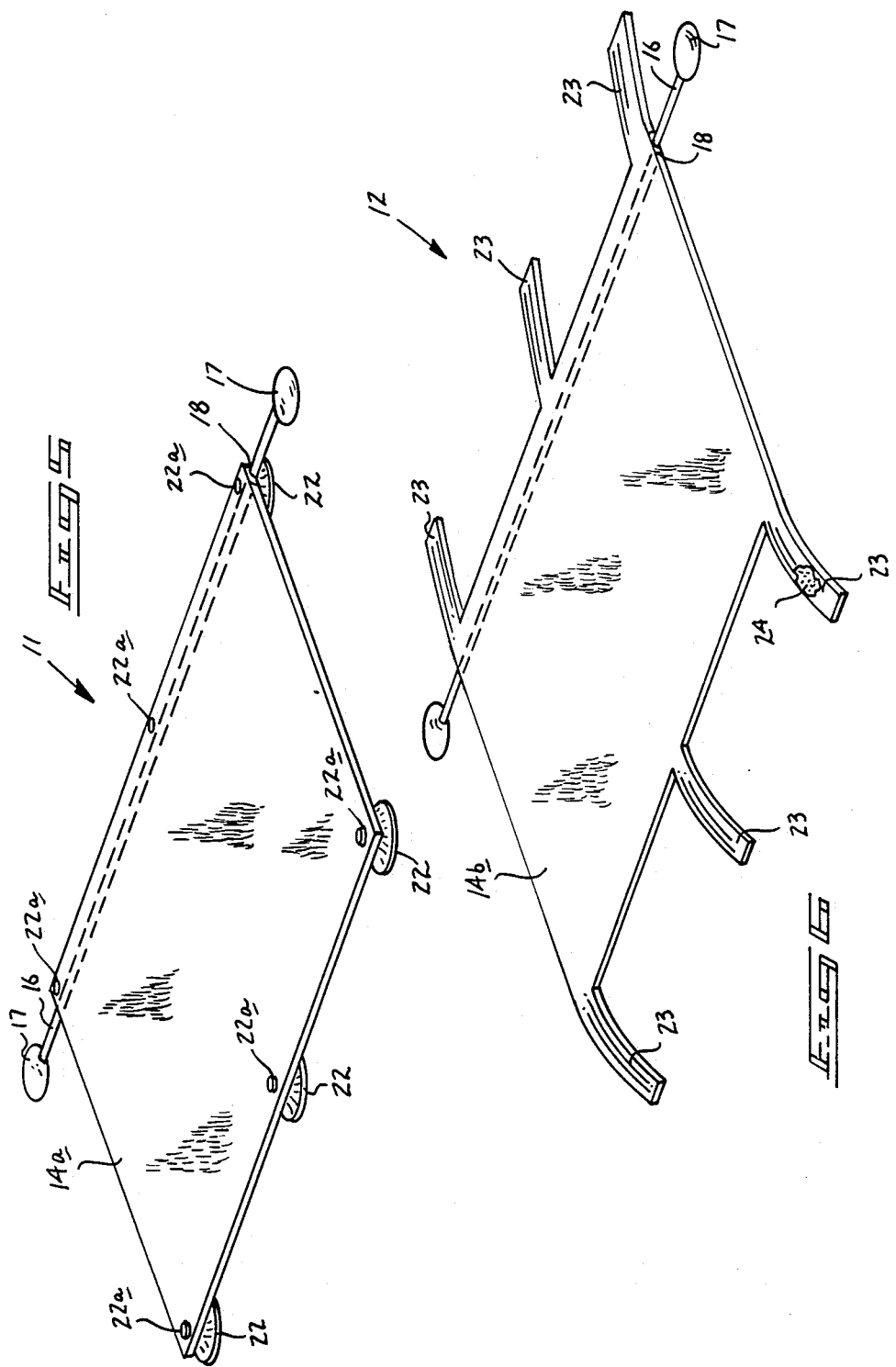

VEHICULAR WINDSHIELD COVER

BACKGROUND OF THE INVENTION

1. Field of the Invention

The field of invention relates to windshield covers, and more particularly pertains to a new and improved vehicular windshield cover wherein the same overlies an associated windshield with enlarged end portions formed to be received within the vehicle between the door frame and the door.

2. Description of the Prior Art

The use of windshield covers and the like is known in the prior art. The advantage of such covers is to minimize thermal expansion and contraction of interior portions of the vehicle when exposed to direct sunlight and to minimize frost adherence during winter months. Examples of the prior art include U.S. Pat. No. 4,685,993 to Hooper, et al., wherein a vehicular cover sheet is provided formed with an enlarged, elongate end for securement interiorly of the vehicle.

U.S. Pat. No. 3,874,437 to Black sets forth a planar sheet material dimensioned to overlie a vehicular windshield with a loop secured within a handle formed at each remote end of the cover with a clip for gripping lateral edge surfaces of the vehicle to maintain the cover in alignment with the windshield.

U.S. Pat. No. 4,049,036 to Gebhardt provides a vehicular windshield cover utilizing semi-flexible material utilizing air spaces therein, wherein the sheet generally contains a plurality of voids or recesses between two opposing layers to affix the same to a window of the vehicle.

U.S. Pat. 4,726,406 to Weatherspoon sets forth a protective vehicle cover wherein the cover utilizes straps secured about stiffener bars on the side edges of the sheet with the straps securable interiorly of the vehicle, but fails to provide the enlarged spherical type ends as set forth in the instant invention.

U.S. Pat. No. 4,597,608 to Duffy sets forth a windshield cover with strap portions securable interiorly of the vehicle to maintain the cover in alignment over the windshield.

As such, it may be appreciated that there is a continuing need for a new and improved vehicular windshield cover wherein the same addresses both the problems of effectiveness in construction and ease of use, and in this respect, the present invention substantially fulfills this need.

SUMMARY OF THE INVENTION

In view of the foregoing disadvantages inherent in the known types of windshield covers now present in the prior art, the present invention provides a vehicular windshield cover wherein the same utilizes both strap means and magnetic securement portions as well as alternative use of suction devices to maintain the cover overlying an associated vehicular windshield. As such, the general purpose of the present invention, which will be described subsequently in greater detail, is to provide a new and improved vehicular windshield cover which has all the advantages of the prior art vehicular windshield covers and none of the disadvantages.

To attain this, the present invention comprises an elongate sheet cover formed with a channel directed coextensively therethrough. The channel contains a securement cord of a length greater than that of the cover with a spherical end secured to each remote end portion of the cord for containment interiorly of an automobile environment between an associated door and door frame. The sheet cover further includes aligned pairs of legs containing pockets wherein the pockets each secure a magnet therein for overlying engagement with metallic surface portions of the automobile. Elongate legs may be utilized in lieu of the pockets wherein the legs are generally hollow and contain magnetic shot therein to enhance securement of the legs to surface portions of the automobile. Further, the cord may be formed of a non-corrosive metallic material or of an elastomeric member to enhance an effective length required by the cord. Alternatively, the sheet itself may be formed of elastomeric material with magnetic shot particles formed within tubular pockets formed coextensively with each end of the sheet in addition to the magnetic leg portion extending in pairs exteriorly of side portions of the sheet. In lieu of magnetic securement portions within the aforenoted pockets, suction cups may be utilized.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular windshield cover which has all the advantages of the prior art vehicular windshield covers and none of the disadvantages.

It is another object of the present invention to provide a new and improved vehicular windshield cover which may be easily and efficiently manufactured and marketed.

It is a further object of the present invention to provide a new and improved vehicular windshield cover which is of a durable and reliable construction.

An even further object of the present invention is to provide a new and improved vehicular windshield cover which is susceptible of a low cost of manufacture with regard to both materials and labor, and which accordingly is then susceptible of low prices of sale to the consuming public, thereby making such vehicular windshield covers economically available to the buying public.

Still yet another object of the present invention is to provide a new and improved vehicular windshield cover which provides in the apparatuses and methods of the prior art some of the advantages thereof, while simultaneously overcoming some of the disadvantages normally associated therewith.

Still another object of the present invention is to provide a new and improved vehicular windshield cover wherein the same includes magnetic and tether line members to secure the cover sheet interiorly of an associated automobile.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of the instant invention secured to an associated vehicular windshield.

FIG. 3 is a top orthographic view of a magnet secured within a pocket, as illustrated in FIG. 1.

FIG. 4 is an orthographic view taken partially in cross-section of the spherical end and its securement to an associated cord.

FIG. 5 is an isometric illustration of a first modification of the instant invention.

FIG. 6 is an isometric illustration of a second modification of the instant invention.

DESCRIPTION OF THE PREFERRED EMBODIMENT

Figure 7:
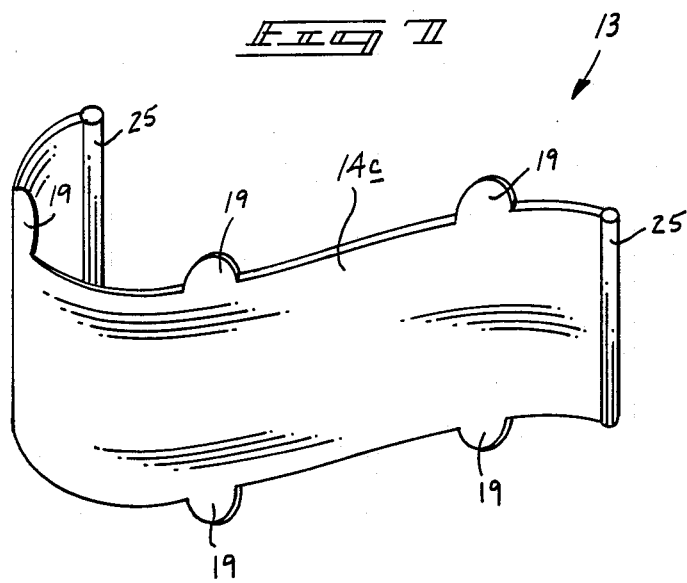
FIG. 7 is an isometric illustration of a third modification of the instant invention.
Figure 8:
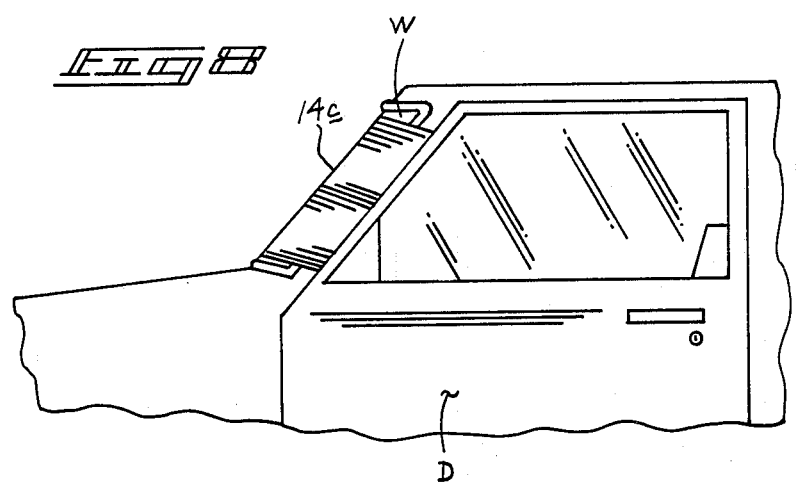
FIG. 8 is an orthographic view taken in elevation of the embodiment of FIG. 7 secured to an associated vehicular windshield.

With reference now to the drawings, and in particular to FIGS. 1 to 8 thereof, a new and improved vehicular windshield cover embodying the principles and concepts of the present invention and generally designated by the reference numerals 10, 11, 12, and 13 will be described.

More specifically, the vehicular Windshield cover 10 essentially comprises a heat reflective polymeric cover sheet 14 formed of a white or silvered coloration to enhance reflection of heat and sunlight as is present during seasonal portions of the year of elevated temperatures.

The polymeric cover sheet includes a elongate cylindrical channel parallel to the rear and forward edges of the sheet positioned adjacent a rear edge of the sheet with metallic reinforcing loops 18 formed at the inlet and outlet portions of the channel to maintain structural integrity of the channel and its relationship to the sheet 14. The reinforcing loops 18 may be formed of brass to resist corrosion and avoid marring of an automotive surface. A flexible cord 16 is received and directed through the channel 15 and is formed of a flexible steel cord material, or alternatively of a stretchable memory retentent material to enhance its securement within the confines of a vehicular interior. The cord 16 includes a large spherical end 17 integrally secured to each remote end of the cord with the spherical ends threadedly receiving a threaded end of the cord 16 to enhance an integral securement of the end 17 to the cord 16. FIGS. 1 and 2 illustrate the use of pairs of outwardly extending securement pads 19 extending outwardly and aligned with the upper and lower surfaces of the sheet The pads are thusly positioned outwardly of the sheet to minimize contact of the sheet with painted surface portions of the associated vehicle, as illustrated in FIG. 2 for example. The pads 19 include a covering fabric 19a, as illustrated in FIG. 3, each containing a single magnet 20 therein of complementary configuration to the pockets formed within the pads 19. Each of the pads 19 are secured at their interface with the sheet 14 by a fabric hinge 21 to facilitate accommodation of the pads to various geometric configurations of the vehicular surface. As illustrated in FIG. 2 for example, the spherical ends 17 are retained within the vehicle and trapped therewithin between the door "D" and door frame of the associated vehicle to maintain the windshield cover 10 in overlying securement relative to the windshield "W".

Reference to FIG. 5 illustrates a first modification of the windshield cover 11 wherein in lieu of the outwardly extending securement pads 19, aligned pairs of suction cups 22 are secured at positions adjacent the respective forward and rear edges of the modified sheet 14a and secured thereto by axles 22a rotatably mounted to the sheet to accommodate positioning of the suction cups 22 as required. Inasmuch as the suction cups position the sheet at a position above a vehicular surface, the suction cups 22 need not be secured to outwardly extending portions of the sheet but may, as illustrated, be secured within the confines of the rectangular configured sheet 14a.

FIG. 6 is illustrative of a second modification of the instant invention wherein pairs of aligned elongate hollow strips 23 extend outwardly in aligned pairs from respective forward and rear side edges of the sheet and aligned therewith. The hollow strips include magnetic spherical shot 24 secured therewithin to enable the shot to reposition itself in a convenient manner, as desired, and to enhance securement of the strips 23 and the associated second modified sheet cover 14b to portions of the vehicular surface.

FIG. 7 illustrates a third modification of the instant invention wherein the securement pads 19 are formed in aligned pairs as set forth in FIGS. I and 2 for example, but wherein the third modified cover sheet 14c is formed of a stretchable, memory retentent fabric to enable the fabric to be stretched tautly over a forward surface of the associated windshield "W" of the vehicular structure. The cover sheet 14c includes tubular pockets coextensively and integrally secured with side edges of the modified sheet 14c. The tubular pockets are filled with magnetic shot 24 of a same type as illustrated in FIG. 6 for example. The tubular pockets enable the pockets to be maintained in secured positioning between the door frame and the door "D" of the associated vehicle, and wherein the magnetic features of the tubular pockets enable securement of the pockets and associated sheet prior to closure of the door thereover.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A vehicular windshield cover for overlying securement of a windshield of an associated vehicle, said cover comprising, a flexible central body portion defined by spaced side edges, and spaced forward and rear edges, the spaced forward and rear edges defining a predetermined length of the central body portion, and plural aligned pairs of securement means secured adjacent the forward and rear edges for securement of the central body portion to selective surface portions of said vehicle, and an elongate flexible cord secured to the central body portion and of a length greater than the predetermined length of the central body portion, and enlarged end members integrally secured to each remote end of the cord for securement of the enlarged end members within said vehicle when the central body portion is overlying the windshield, and wherein the central body portion includes a heat reflective surface, and wherein the securement means include aligned pairs of securement pads, each pad including a pocket formed about a surface of the pad with a single magnet secured within each pocket, and wherein the securement means include plural aligned pairs of elongate hollow legs, each leg filled with magnetic spherical shot for securement of the legs to surface portions of the automobile.

2. A vehicular windshield cover as set forth in claim 1 wherein the securement pads are each hingedly mounted to the central body portion at the respective forward and rear edges thereof.

3. A vehicular windshield cover as set forth in claim 2 wherein the central body portion includes an elongate cylindrical channel formed therethrough adjacent a rear edge of the central body portion and parallel thereto wherein the elongate channel slidably receives the flexible cord therein.

4. A vehicular windshield cover as set forth in claim 3 wherein the flexible cord is formed of an elastomeric material.

5. A vehicular windshield cover as set forth in claim 3 wherein the flexible cord is formed of steel cord.

6. A vehicular windshield cover as set forth in claim 4 wherein the elongate channel further includes a reinforcing brass ring secured at the forward and rear terminal ends of the channel with the cord directed through the reinforcing rings to maintain the structural integrity of the channel.

* * * * *